(12) United States Patent
Yasumura et al.

(10) Patent No.: US 10,317,626 B2
(45) Date of Patent: Jun. 11, 2019

(54) INNER AND OUTER COLLIMATOR ELEMENTS FOR AN OPTICAL CIRCUIT SWITCH

(71) Applicant: Google LLC, Mountain View, CA (US)

(72) Inventors: Kevin Y. Yasumura, Lafayette, CA (US); Jill D. Berger, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/788,153

(22) Filed: Oct. 19, 2017

(65) Prior Publication Data
US 2018/0364419 A1 Dec. 20, 2018

Related U.S. Application Data

(60) Provisional application No. 62/520,238, filed on Jun. 15, 2017.

(51) Int. Cl.
*G02B 6/35* (2006.01)
*H04Q 11/00* (2006.01)
*G02B 6/32* (2006.01)

(52) U.S. Cl.
CPC ............ *G02B 6/3518* (2013.01); *G02B 6/32* (2013.01); *G02B 6/356* (2013.01); *G02B 6/3512* (2013.01);
(Continued)

(58) Field of Classification Search
None
See application file for complete search history.

(56) References Cited

U.S. PATENT DOCUMENTS 6,188,814 B1 * 2/2001 Bhalla ................... G02B 6/359
385/134
6,445,840 B1 9/2002 Fernandez et al.
(Continued)

FOREIGN PATENT DOCUMENTS

CN 103608708 A 2/2014
CN 103748511 A 4/2014
(Continued)

OTHER PUBLICATIONS

International Search Report and Written Opinion dated Aug. 3, 2018 in PCT Application No. PCT/US2018/022680.
(Continued)

*Primary Examiner* — Chad H Smith
(74) *Attorney, Agent, or Firm* — McDermott Will & Emery LLP

(57) ABSTRACT

An optical circuit switch includes a fiber hole array, a plurality of internal optical fibers, a collimating lens array, a MEMS mirror array, and a reflective surface. The fiber hole array includes an array of receptacles shaped to accept respective internal optical fibers. The collimating lens array is positioned adjacent to the fiber hole array. Each collimator of the collimating lens array optically couples light into or out of a corresponding one of the internal optical fibers. The fiber hole array, the collimator, the MEMS mirror array and the reflective surface are positioned relative to one another such that light exiting each of the internal optical fibers passes through its corresponding collimator and is redirected by a first mirror within the MEMS array towards the reflective surface, which directs the light back towards a second mirror of the MEMS mirror array, which in turn redirects the light towards a second internal optical fiber.

17 Claims, 6 Drawing Sheets

(52) U.S. Cl.
CPC ......... *G02B 6/3546* (2013.01); *G02B 6/3556* (2013.01); *G02B 6/3568* (2013.01); *G02B 6/3588* (2013.01); *H04Q 11/0005* (2013.01); *G02B 6/359* (2013.01)

(56) References Cited

U.S. PATENT DOCUMENTS

| | | |
|---|---|---|
| 6,445,841 B1 | 9/2002 | Gloeckner et al. |
| 6,449,406 B1 | 9/2002 | Fan et al. |
| 6,498,870 B1 | 12/2002 | Wu et al. |
| 6,526,198 B1 | 2/2003 | Wu et al. |
| 6,556,741 B1 | 4/2003 | Fan |
| 6,567,604 B1 | 5/2003 | Yeh et al. |
| 6,571,029 B1 | 5/2003 | Kruglick et al. |
| 6,573,156 B1 | 6/2003 | Wang et al. |
| 6,600,850 B1 | 7/2003 | Fan |
| 6,614,982 B2 | 9/2003 | Barrett |
| 6,680,776 B2 | 1/2004 | Barrett |
| 6,731,833 B2 | 5/2004 | Sandler et al. |
| 6,800,856 B2 | 10/2004 | Bruns |
| 6,835,002 B2 | 12/2004 | Bruns |
| 7,177,497 B2 | 2/2007 | Barrett |
| 7,386,201 B1 | 6/2008 | DiRuscio et al. |
| 7,460,294 B2 | 12/2008 | Bruns |
| 7,734,127 B2 | 6/2010 | Korevaar et al. |
| 7,777,961 B2 | 8/2010 | Korevaar et al. |
| 7,872,394 B1 | 1/2011 | Gritters et al. |
| 8,022,379 B2 | 9/2011 | Davis et al. |
| 8,218,918 B2 | 7/2012 | Tigli et al. |
| 8,691,099 B2 | 4/2014 | Gritters et al. |
| 2003/0138210 A1 | 7/2003 | Steinberg et al. |
| 2004/0071393 A1 | 4/2004 | Staker et al. |
| 2004/0202407 A1 | 10/2004 | Hoke et al. |
| 2006/0088242 A1 | 4/2006 | Novotny |
| 2006/0239608 A1 | 10/2006 | Akashi |
| 2008/0240649 A1* | 10/2008 | Korevaar ............. G02B 6/3582 385/16 |
| 2010/0303407 A1 | 12/2010 | Sakai |
| 2014/0341504 A1 | 11/2014 | Darling |

FOREIGN PATENT DOCUMENTS

| | | |
|---|---|---|
| EP | 1099970 A2 | 5/2001 |
| EP | 1102096 A2 | 5/2001 |
| EP | 1193528 A2 | 4/2002 |
| TW | 201506478 A | 2/2015 |
| WO | 2012162926 A1 | 12/2012 |
| WO | 2017/019557 A1 | 2/2017 |

OTHER PUBLICATIONS

Fernandez, Andres, et al. "Modular MEMS design and fabrication for an 80 × 80 transparent optical cross-connect switch." In Optomechatronic Micro/Nano Components, Devices, and Systems, vol. 5604, pp. 208-218. International Society for Optics and Photonics, Oct. 2004.

Kawai, Masaki, et al. "Optical components and devices for next-generation photonic networks." Fujitsu Sci. Tech. J vol. 42, No. 4, pp. 483-493, Oct. 2006.

Extended European Search Report dated Sep. 13, 2018 in European Patent Application No. 18163682.0 (10 pages).

Combined Search and Examination Report dated Sep. 5, 2018 in GB Application No. 1804695.3 (9 pages).

Office Action dated Jan. 16, 2019 in TW Application No. 107110899, and English translation thereof.

* cited by examiner

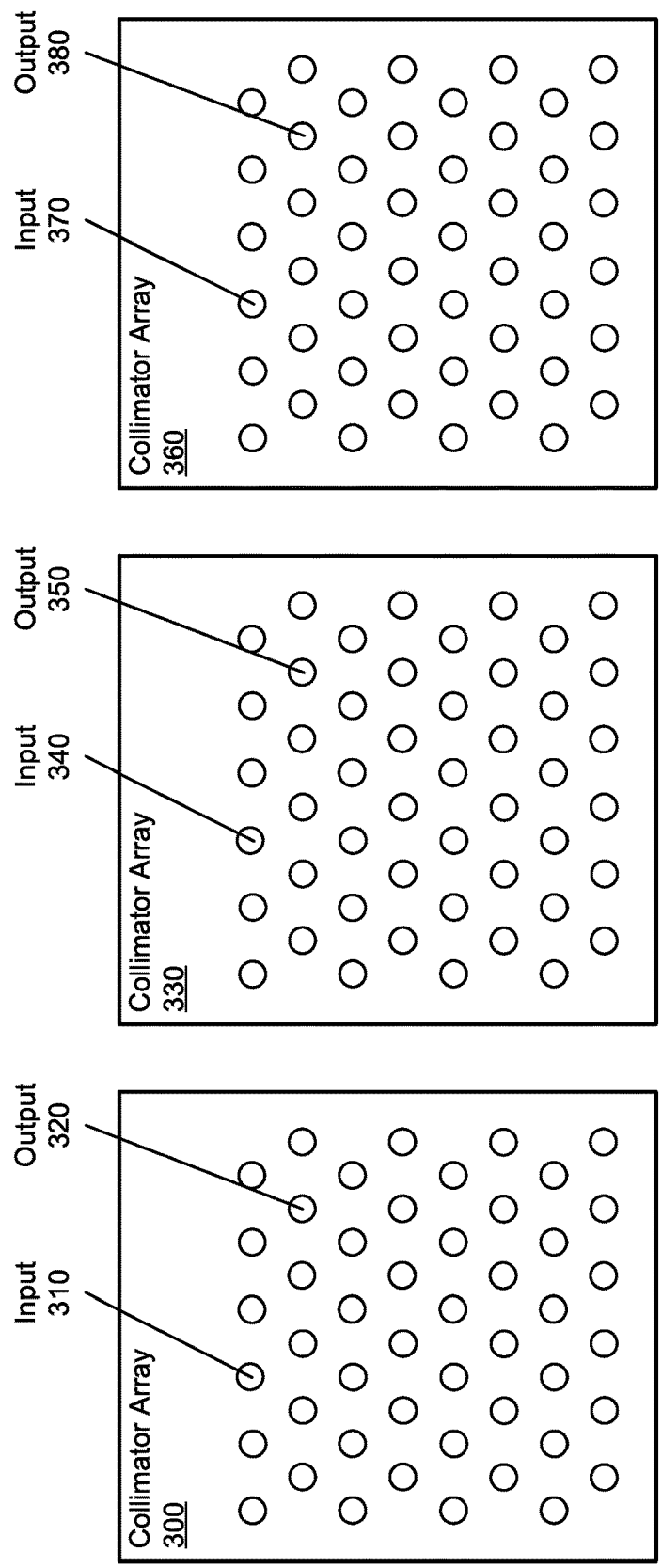

INNER AND OUTER COLLIMATOR ELEMENTS FOR AN OPTICAL CIRCUIT SWITCH

RELATED APPLICATIONS

The present application claims the benefit of and priority to U.S. Provisional Patent Application No. 62/520,238, entitled "INNER AND OUTER COLLIMATOR ELEMENTS FOR AN OPTICAL CIRCUIT SWITCH," and filed on Jun. 15, 2017, the entire contents of which are hereby incorporated by reference for all purposes.

BACKGROUND

In optical networks, signal switching and routing of optical signals can be performed with an optical circuit switch (OCS). An OCS is an all-optical switching matrix that can convey optical signals from input ports to output ports. The OCS can switch an optical signal from one path to another by repositioning one or more mirrors in a mirror array. Microelectromechanical system (MEMS) mirror assemblies can be used to provide fast switching in a device with a relatively small footprint.

SUMMARY

At least one aspect is directed to an optical circuit switch. The optical circuit switch includes a fiber hole array including an array of receptacles shaped to accept respective optical fibers. The optical circuit switch includes a plurality of internal optical fibers enclosed within the optical circuit switch. One end of each fiber is disposed within a respective receptacle of the fiber hole array. The optical circuit switch includes a collimating lens array positioned adjacent to the fiber hole array and including a plurality of collimators. Each collimator optically couples light into or out of a corresponding one of the internal optical fibers. The optical circuit switch includes a MEMS mirror array. The optical circuit switch includes a first reflective surface. The fiber hole array, the collimator, the MEMS mirror array and the first reflective surface are positioned relative to one another such that light exiting each of the internal optical fibers passes through its corresponding collimator and is redirected by a first mirror within the MEMS array towards the first reflective surface, which directs the light back towards a second mirror of the MEMS mirror array, which in turn redirects the light towards a second internal optical fiber.

In some implementations, the optical circuit switch can include a plurality of external optical fiber input ports. Each optical fiber input port can couple to one of the internal optical fibers. The optical circuit switch can include a plurality of external optical fiber output ports. Each optical fiber output port can couple to one of the internal optical fibers.

In some implementations, the MEMS mirror array is configured such that each mirror can be rotated in about two axes by less than about 10° while directing light from an internal optical fiber coupled to an external optical fiber input port to any internal optical fiber coupled to an external optical fiber output port.

In some implementations, each of the internal optical fibers that corresponds to a collimator located around a perimeter of the collimating lens array couples to an external optical fiber output port. Each of the internal optical fibers that corresponds to a collimator located inside the perimeter of the collimating lens array can couple to an external optical fiber input port.

In some implementations, each of the internal optical fibers that corresponds to a collimator located around a perimeter of the collimating lens array couples to an external optical fiber input port. Each of the internal optical fibers that corresponds to a collimator located inside the perimeter of the collimating lens array can couple to an external optical fiber output port.

In some implementations, each of the internal optical fibers that corresponds to a collimator located within a first contiguous half of the collimating lens array couples to an external optical fiber output port. Each of the internal optical fibers that corresponds to a collimator located within a second contiguous half of the collimating lens array can couple to an external optical fiber input port. In some implementations, the optical circuit switch can include driver circuits configured to apply voltages to actuators coupled to each MEMS mirror to cause the MEMS mirrors to rotate in two directions about one axis and in only a single direction about a second axis.

In some implementations, within the collimating lens array, collimators corresponding to internal optical fibers coupled to external optical fiber input ports and collimators corresponding to internal optical fibers coupled to external optical fiber output ports alternate according to a checkerboard pattern.

In some implementations, the optical circuit switch can include a second reflective surface positioned within the optical path between the collimating lens array and the MEMS mirror array. The first and second reflective surfaces can be configured to reflect light of at least a first wavelength and to be substantially transmissive with respect to a light of a second wavelength. The optical circuit switch can include a light source located behind the second reflective surface and directed towards the MEMS mirror array. The optical circuit switch can include a light detector located behind the first reflective surface to detect light emitted by the light source that has passed through the second reflective surface, off of the mirror array, and through the first reflective surface.

The optical circuit switch can include a processor configured to receive an output signal from the light detector and to determine calibration parameters for the MEMS mirror array based on the output signal.

At least one aspect is directed to an optical circuit switch. The optical circuit switch includes a plurality of external optical fiber input ports, a plurality of external optical fiber output ports, a fiber hole array including an array of receptacles shaped to accept optical fibers, a collimating lens array including a plurality of collimators positioned adjacent to the fiber hole array and configured for directing light into or out of optical fibers disposed in the receptacles of the fiber hole array, a plurality of internal optical fibers enclosed within the optical circuit switch, and a MEMS mirror array. Each internal optical fiber optically couples at one end to an optical fiber input port or an optical fiber output port, and is disposed at an opposite end into a respective receptacle in the fiber hole array. The MEMS mirror array selectively controls optical paths of light exiting respective optical fibers disposed in the fiber hole array such that such light is introduced into different respective optical fibers disposed in the fiber hole array.

In some implementations, the optical circuit switch includes a first reflective surface. The fiber hole array, the collimator, the MEMS mirror array and the first reflective surface are positioned relative to one another such that light exiting each of the internal optical fibers passes through its corresponding collimator and is redirected by a first mirror within the MEMS array towards the first reflective surface, which directs the light back towards a second mirror of the MEMS mirror array, which in turn redirects the light towards a second internal optical fiber.

In some implementations, the optical circuit switch includes a second reflective surface, wherein the second reflective surface is positioned to redirect light passing through the collimator towards the MEMS mirror array.

In some implementations, the first reflective surface is a dichroic splitter and the second reflective surface is a dichroic combiner. The optical circuit switch can include a laser and a first lens configured to direct the laser beam through the dichroic combiner to a mirror of the MEMS mirror array, and a second lens and a camera configured to receive a reflection of the laser beam from the mirror.

In some implementations, each of the internal optical fibers that corresponds to a collimator located around a perimeter of the collimating lens array couples to an external optical fiber output port, and each of the internal optical fibers that corresponds to a collimator located inside the perimeter of the collimating lens array couples to an external optical fiber input port.

In some implementations, each of the internal optical fibers that corresponds to a collimator located around a perimeter of the collimating lens array couples to an external optical fiber input port, and each of the internal optical fibers that corresponds to a collimator located inside the perimeter of the collimating lens array couples to an external optical fiber output port.

In some implementations, each of the internal optical fibers that corresponds to a collimator located within a first contiguous half of the collimating lens array couples to an external optical fiber output port, and each of the internal optical fibers that corresponds to a collimator located within a second contiguous half of the collimating lens array couples to an external optical fiber input port.

In some implementations, the optical circuit switch includes, within the collimating lens array, collimators corresponding to internal optical fibers coupled to external optical fiber input ports and collimators corresponding to internal optical fibers coupled to external optical fiber output ports alternate according to a checkerboard pattern.

At least one aspect is directed to a method of operating an optical circuit switch. The method includes receiving an optical signal at an external input port. The method includes conveying the optical signal to a first collimator of a collimating lens array via a first internal optical fiber of a plurality of optical fibers. A receptacle of a fiber hole array accepts the first internal optical fiber and positions it adjacent to the first collimator. The method includes projecting the optical signal towards a first mirror of a mirror array using the first collimator. The method includes redirecting the optical signal towards a reflective surface using the first mirror. The method includes receiving a reflection of the optical signal from the reflective surface at a second mirror of the mirror array. The method includes redirecting the reflected optical signal towards a second collimator of the collimating lens array using the second mirror. The method includes conveying the optical signal to an external output port via a second internal optical fiber of the plurality of optical fibers. The mirror array is configured to controllably create an optical path from any external input port of the OCS to any external output port of the OCS.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A, 3B, and 3C are diagrams of cross sections of various collimating lens arrays, according to illustrative implementations;

DETAILED DESCRIPTION

Figure 1:
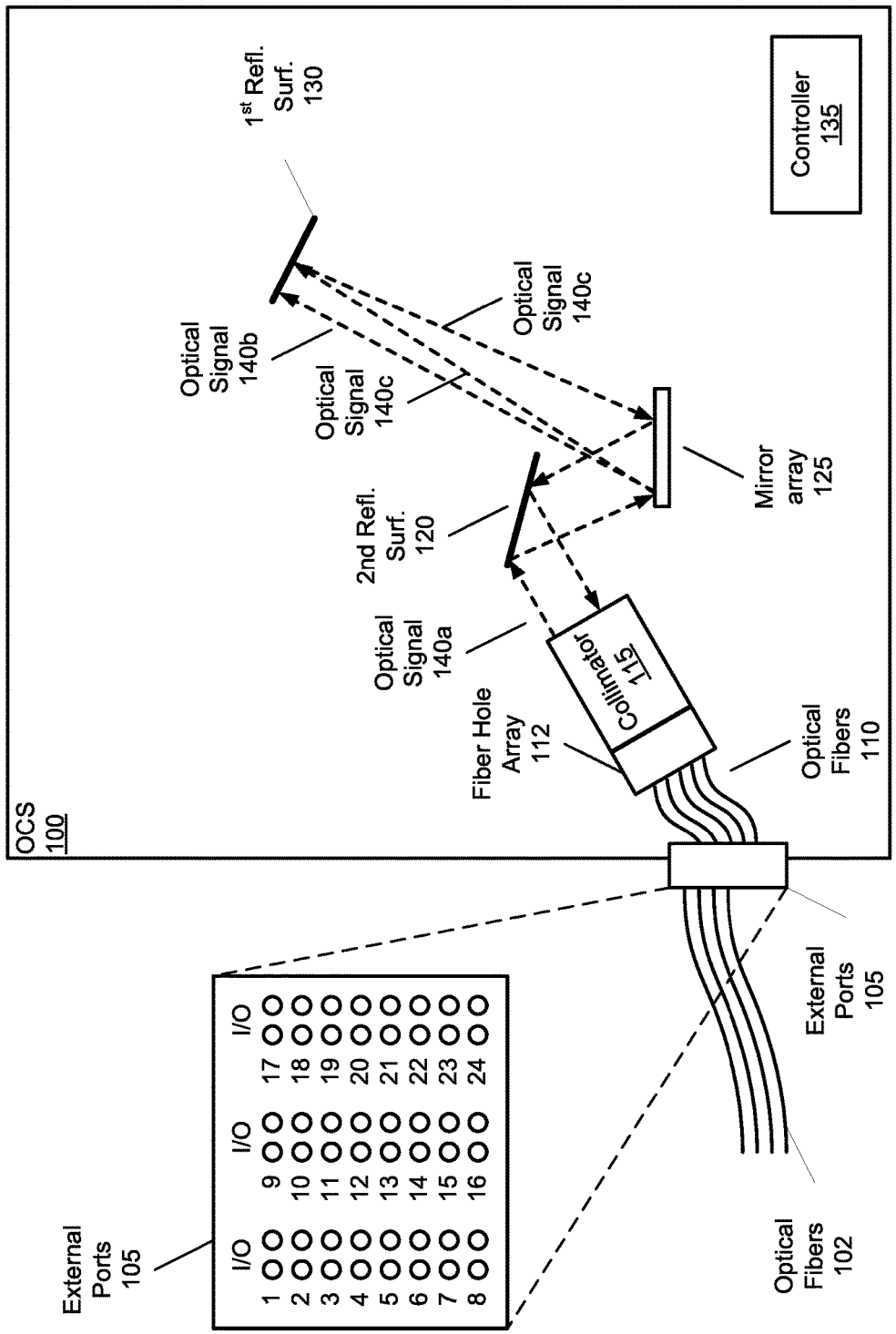
FIG. 1 is a block diagram of an optical circuit switch (OCS), according to an illustrative implementation.

This disclosure generally relates to an optical circuit switch (OCS). An OCS is an all-optical switching matrix that, in some implementations, can direct optical signals from an external input port to an external output port by changing the positions of mirrors in a two-dimensional microelectromechanical system (MEMS) mirror array. OCSs allow for switching in the optical domain without converting the optical signals to electrical signals and back again. This reduces latency, keeps traffic more secure, keeps wavelengths within a specified range, and makes the switch agnostic with regard to encoding and data rates.

An OCS can include an array of external input and output ports, a plurality of internal optical fibers, a collimating lens array, a mirror array, and a reflective surface. Each external port retains first ends of the internal optical fibers. A fiber hole array positioned adjacent to the collimating lens array can retain second ends of the internal optical fibers, and position them such that they can convey optical signals to and from their respective collimators. Each collimator is configured to direct an optical signal to, or receive an optical signal from, a mirror. Each mirror of the mirror array is movable under the control of a controller to direct an optical signal from a collimator towards the reflective surface, or from the reflective surface towards a collimator. In this manner optical paths can be opened, moved, or closed between various external input ports and external output ports.

In an example operation, an optical signal is coupled into an external input port. A first internal optical fiber conveys the optical signal to a first collimator of the collimating lens array. The first collimator directs the optical signal towards a first mirror of the mirror array. The first mirror redirects the optical signal towards the reflective surface, which reflects the optical signal back towards a second mirror of the mirror array. The second mirror redirects the reflected optical signal towards a second collimator of the collimating lens array. The second collimator couples the reflected optical signal into a second internal optical fiber, which conveys the optical signal to an external output port.

Because the first collimator and the first mirror are coupled via the first internal optical fiber to an external input port, the first collimator and the first mirror can be referred to as an "input collimator" and an "input mirror." Similarly, because the second collimator is coupled via the second internal optical fiber to the external output port, the second collimator can be referred to as an "output collimator." The collimating lens array can include a plurality of input collimators and an equal number of output collimators. Input collimators and output collimators can be structurally the same, however, and are designated as "input" or "output" by virtue of their correspondence to an external input port or an external output port, respectively. Likewise, the mirror array can include "input mirrors" and "output mirrors," which can be structurally the same, but designated as "input" or "output" by virtue of their use in directing an optical signal received from an external input port or to external output port.

Certain benefits can be achieved by arranging the input and output collimators in particular ways. In some implementations, the input collimators can be arranged around the periphery of the collimating lens array while the output collimators are arranged in the interior of the collimating lens array, or vice-versa. This arrangement can reduce the maximum mirror rotation angle necessary for a mirror reflecting an optical signal between collimators at extreme ends of the collimating lens array. A MEMS mirror in the OCS can route optical signals by rotating under the control of analog voltages applied to actuators coupled to the mirror. For large displacements of the mirror from an equilibrium position, the driving voltages needed for the electrostatic actuators can be high, and torsion beams supporting the mirror can experience mechanical stress. Reducing the maximum necessary mirror angle can reduce both the voltages necessary for actuation and the stress placed on the torsion beams. Mirrors can also tend to "ring" for a period of time following actuation depending on the resonant frequency of the mirror, its supports, and the amount of mechanical and fluid damping around the actuator and mirror. During the period of ringing, the mirror may not be able to direct the optical signal to its intended destination, resulting in a delay in switching. Reducing the maximum necessary mirror angle allows for the mirror to sit adjacent a shallower cavity in a base substrate on over which the mirror is positioned. The shallower cavity can increase the fluid damping experienced by the mirror. Increasing the damping of the mirror movement lowers the quality factor (Q) of the system, thereby reducing the ringing. Reducing the maximum necessary mirror angle can provide additional benefits. For example, it can allow for relaxed tolerances for the electrostatic actuators that move the mirrors. The relaxed tolerances can increase the process window size, easing fabrication of the mirror arrays and lowering cost. Shallower angles for the MEMS mirrors will allow for lower cost and lower loss coatings to be applied to the MEMS package optical windows and associated optical elements such as beam splitters and combiners.

In some implementations, the input collimators can be located within a first contiguous half of the collimating lens array while the output collimators are located within a second contiguous half of the collimating lens array. Arranging the collimators in this manner can simplify the circuitry used to control mirror position. For example, the mirrors of the mirror array will only have to redirect light from collimators in the first contiguous half of the collimating lens array to collimators in the second contiguous half of the collimating lens array; thus, the mirrors will not require drivers and electrical connections to actuate the mirrors to move in directions away from the mirrors in the other contiguous half of the mirror array. In some implementations, the input collimators and the output collimators can be arranged in an alternative checkerboard pattern.

FIG. 1 is a block diagram of an optical circuit switch (OCS) 100, according to an illustrative implementation. The OCS 100 can route optical signals to and from external ports 105. The external ports 105 can include a plurality of external input ports and an equal number of external output ports. The external ports 105 can receive external optical fibers 102 conveying optical signals to and from elsewhere in the network or from an external network. Internal optical fibers 110 convey optical signals between the external ports 105 and a fiber hole array 112. The fiber hole array 112 retains ends of the internal optical fibers 110 in a position and orientation that facilitates transmission of optical signals between the internal optical fibers 110 and the collimating lens array 115. The collimating lens array 115 directs the optical signals towards, and receives optical signals from, a mirror array 125. The mirror array 125 can redirect optical signals to, and receive reflected optical signals from, a first reflective surface 130. In some implementations, the OCS 110 can include a second reflective surface 120 for redirecting light from the collimating lens array 115 to the mirror array 125, and vice-versa. The second reflective surface 120 is not necessary for optical switching operations, but can be useful for implementing self-diagnostic features such as those described with reference to FIG. 5. The mirror array 125 includes an array of mirrors that can be individually moved to control the direction of optical signals reflecting off each mirror.

The collimating lens array 115 takes the individual optical signals coupled from the internal optical fibers 110 by the fiber hole array 112 and directs them as collimated, parallel beams towards the mirror array 125 or the second reflective surface 120. Similarly, the collimating lens array 115 can receive light returning from the mirror array 125 or the second reflective surface 120, and couple the optical signals into the internal optical fibers 110. In some implementations, the fiber hole array 112 and the collimating lens array 115 can be attached to one another using a bonding technique such as epoxy, or mechanical fasteners such as screws, clips, or latches. The fiber hole array 112 can facilitate efficient transmission of optical signals by positioning the internal optical fibers 110 with respect to the collimators of the collimating lens array 115 to promote efficient transmission of optical signals across the different media. In some implementations, collimators corresponding to external input ports and collimators corresponding to external output ports can be arranged with respect to each other in manners that provide benefits to the OCS 100. The collimating lens array 115 of the OCS 100, including possible arrangement of input and output collimators, is described in further detail below with respect to FIGS. 3A, 3B, and 3C.

The mirror array 125 can redirect optical signals to and from the first reflective surface 130. For example, the collimating lens array 115 can emit an optical signal 140a. The mirror array 125 can redirect the optical signal 140a. The optical signal 140b and the optical signal 140c represent two possible directions in which the mirror array 125 can direct the optical signal 140a. The optical signals 140c can reflect off of the first reflective surface 130 and return to a different mirror of the mirror array 125, and thus a different collimator of the collimating lens array 115 from which it came, thereby creating an optical path between two different external ports 105. The optical signal 140b may reflect off of the first reflective surface 130 back towards the same mirror of the mirror array 125, and thus back to the same collimator of the collimating lens array 115 from which it came. Such straight loop-back paths can be used for calibration of the individual mirrors of the mirror array 125. For example, normally one might only calibrate non-returning paths. For N inputs and M outputs, one can send light through each of the N inputs to each of the M outputs, and optimize the MEMS mirror angles to get the maximum light through the system for each combination of N and M (where the input external port 105 is always different from the output external port 105). To calibrate the self-returning paths (that is, light entering and leaving the OCS 100 via the same external port 105), a single mirror can reflect both the outgoing and returning optical signal. To calibrate self-returning paths, however, one would need to put an optical circulator in front of each external port 105 input and pull out the light that is on a return path through the OCS 100. The mirror array 125 of the OCS 100 is described in further detail below with respect to FIGS. 2A, 2B, 4A, 4B, and 4C.

In some implementations, the second reflective surface 120 and the first reflective surface 130 can include optical components with dichroic properties that can either transmit or reflect light depending on wavelength. Such components can be useful when including self-diagnostic features such as additional light sources and detectors into the OCS 100. Example self-diagnostic features are described in detail below with regard to the OCS 500 illustrated in FIG. 5.

The OCS 100 includes a controller 135 for performing control and diagnostic operations of the OCS 100. The controller 135 can include programmable logic such as a field-programmable gate array (FPGA), a microcontroller, or a microprocessor. The controller 135 can include a memory and interfaces for interacting with other components of the OCS 100. The controller 135 can include interfaces for receiving commands and transmitting status information via display, audio, input, and networking devices. The controller 135 can receive configuration commands from an external system to open or close optical signal channels between respective external ports 105, and execute the commands by adjusting the position of mirrors in the mirror array 125. In some implementations, the controller 135 can include drivers (not shown) for providing analog voltage signals to the mirror array 125 for controlling the position of individual mirrors. In some implementations, the drivers for providing the analog voltage signals can be physically separate from the controller 135, and either adjacent to or integrated with the mirror array 125. In some implementations, the drivers can include digital-to-analog convertor (DAC) for converting a digital signal from the controller 135 into an analog voltage suitable for controlling the position of mirrors in the mirror array 125. In some implementations, the drivers can include voltage amplifiers for amplifying relatively low-voltage (e.g., several volts) control and/or logic signals from the controller 135 to the relatively higher voltage (e.g., tens of volts) used to control the position of mirrors in the mirror array 125. In some implementations, the controller 135 can perform self-calibration operations of the OCS 100. The controller 135 can be internal to, or external to, the OCS 100. In some implementations, the controller 135 can control self-diagnostic features of the OCS 100 such as a light injector and camera for determining the positions of the mirrors of the mirror array 125. The self-diagnostic features of the OCS 100 are described in further detail below with regard to FIG. 5.

Figure 2A:
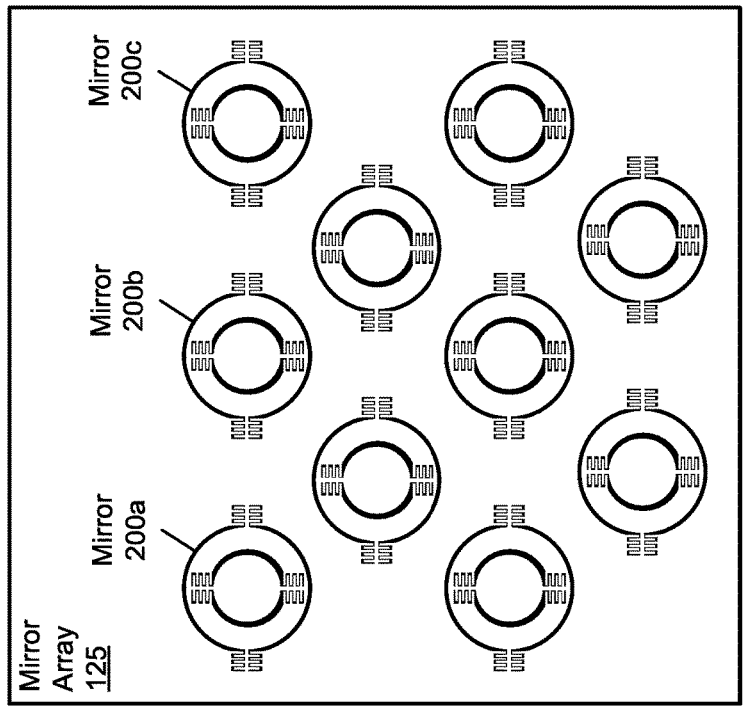
FIG. 2A is a diagram of a microelectromechanical system (MEMS) mirror, according to an illustrative implementation.

FIG. 2A is a diagram of a microelectromechanical system (MEMS) mirror assembly 200, according to an illustrative implementation. The MEMS mirror array 125 can include many MEMS mirror assemblies 200. The MEMS mirror assembly 200 includes three main components: a mirror platform 205, a gimbal 210, and a mirror substrate 215. The mirror platform 205, gimbal 210, and mirror substrate 215 are disposed above a base substrate (not shown). The mirror platform 205 can include a reflective surface and/or coating on its upper side. The MEMS mirror assembly 200 includes actuators for moving the components. In the implementation shown in FIG. 2A, the MEMS mirror assembly 200 can be actuated in two dimensions. The actuators 220a and 220b (collectively "actuators 220") can move the mirror platform 205 with respect the gimbal 210, and the actuators 225a and 225b (collectively "actuators 225") can move the gimbal 210 and the mirror platform 205 with respect to the mirror substrate 215.

In some implementations, the actuators 220 and 225 can apply torque to their inner component. For example, the actuators 220 can apply torque to rotate the mirror platform 205 to cause rotation in the X-Z plane (i.e., about the Y-axis), and the actuators 225 can apply torque to rotate the gimbal 210 to cause rotation in the Y-Z plane (i.e., about the X-axis). In this manner, the actuators 220 and the actuators 225 can move the mirror platform 205 about a first axis and a second axis, respectively, where the axes are substantially orthogonal to each other.

In some implementations, the actuators 220 and 225 can be vertical comb-drive electrostatic actuators. Each actuator 220 and 225 can have a first part and a second part; for example, the actuators 220 can have a left side and a right side, and the actuators 225 can have a top side and a bottom side, as oriented in the drawing. A first voltage applied to the first part of the actuator can cause the actuator to move the mirror platform 205 in a first direction. In some implementations, the first direction can be a rotational direction about an axis of motion of the mirror platform 205. A second voltage applied to the second part of the actuator can cause the actuator to move the mirror platform in a second direction opposite the first direction. For example, the first voltage may cause the mirror platform 205 to move clockwise around the axis, and the second voltage may cause the mirror platform 205 to move counterclockwise around the axis.

In some implementations, the actuators 220 and 225 and the movable components (i.e., the mirror platform 205 and the gimbal 210) of the MEMS mirror assembly 200 can behave as a spring-mass system. The MEMS mirror assembly 200 can have some intrinsic damping due to the material properties of the flexible mounts or beams supporting the movable components, and any fluid such as gas or liquid surrounding the movable components. The system may, however, be underdamped such that the movable components oscillate or ring after a perturbation such as a physical shock or vibration, or a repositioning of the mirror platform 205 in normal operation. This unwanted movement of the mirror platform 205 can render the MEMS mirror assembly 200 unusable for directing an optical signal until the movement subsides and the mirror platform 205 achieves an equilibrium. Reducing the maximum necessary mirror angle can reduce the clearance space necessary under the mirror platform 205. The mirror platform 205 is positioned over a cavity defined in the base substrate. Fluid—either gas or liquid—in the cavity can provide fluid damping to movement of the mirror platform 205. Reducing the space between an underside of the mirror platform 205 and the bottom of the cavity in the base substrate can increase the fluid damping. The increased fluid damping lowers the quality factor (Q) of the spring-mass system formed by the mirror platform 205 and its supporting torsion beams. The mirror platform 205 will thus oscillate for fewer cycles before reaching equilibrium, allowing transmission of an optical signal to begin sooner.

Reducing the maximum necessary mirror angle can provide other benefits as well. The reduced mirror angles can lower the required actuation voltage needed for switching the optical signals. Lowering the driving voltages can reduce power consumption, allow for smaller and/or less expensive drive circuitry, and reduce the overall size of the mirror array 125 by allowing for thinner and more closely spaced signal traces to the mirror actuators 220 and 225. The reduced mirror angles can also lower mechanical stresses on the torsion beams supporting the mirror platform 205 and the gimbal 210, potentially prolonging the life of the mirror array 125. Finally, the reduced maximum mirror angles can allow the MEMS mirror assembly 200 to operate properly despite more variation in component dimensions. The relaxed tolerances for the actuators 220 and 225, the mirror platform 205, and the gimbal ease fabrication of the mirror arrays and lower cost. In some implementations, the maximum necessary mirror angle from a rest position is less than or equal to +/−1.5 degrees while directing light from an internal optical fiber coupled to an external optical fiber input port to any internal optical fiber coupled to an external optical fiber output port. In some implementations, the maximum necessary mirror angle is less than or equal to +/−1 degrees. In some implementations, the maximum necessary mirror angle is less than or equal to +/−3 degrees. In some implementations, the mirror may move in only one direction with respect to a particular plane. In such implementations, the maximum necessary mirror angle may be from 0 degrees to +3 degrees, or from 0 degrees to +6 degrees.

Figure 2B:
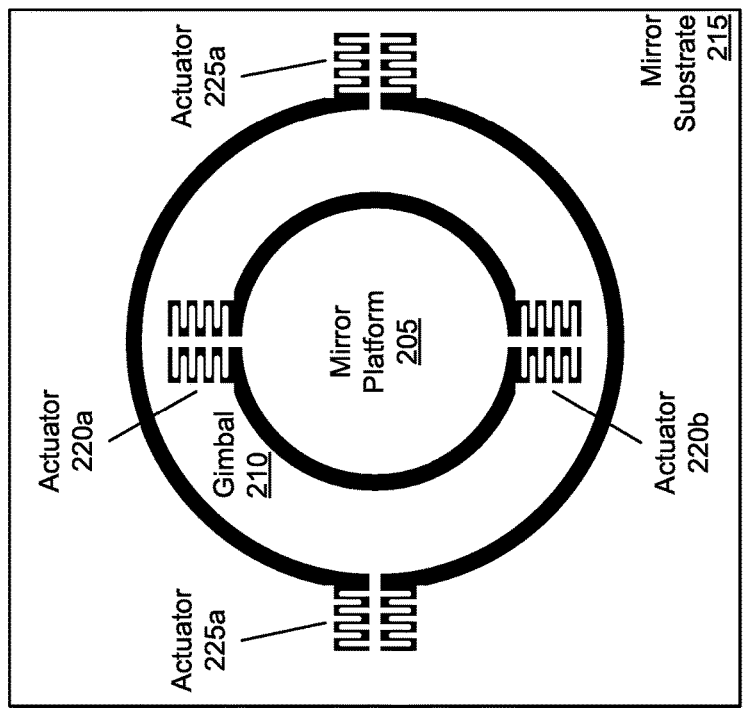
FIG. 2B is a diagram of a MEMS mirror array, according to an illustrative implementation.

FIG. 2B is a diagram of a MEMS mirror array 125, according to an illustrative implementation. The MEMS mirror array 125 can include a plurality of MEMS mirror assemblies 200a-200c (collectively "MEMS mirror assemblies 200"). In some implementations, the MEMS mirrors can be arranged in an offset grid as shown in FIG. 2B, in a square grid, or in a pattern of concentric circles or spirals. In some implementations, the distribution of the MEMS mirror assemblies 200 in the MEMS mirror array 125 will correspond to the configuration of the collimators 115 such that each optical signal beam entering or leaving the collimator 115 is directed to or from a corresponding MEMS mirror assembly 200 of the MEMS mirror array 125. In some implementations, the MEMS mirror array 125 can include signal traces (not shown) of copper, silicon, metal, or other conductive material carrying switching voltages to the actuators 220 and 225. The switching voltage can emanate from the controller 135 or from a digital-to-analog converter associated with the controller 135 that can convert switching commands from the controller 135 to analog voltages for actuating the MEMS mirror assemblies 200. In some implementations, the MEMS mirror array 125 can include four signal traces for each MEMS mirror assembly 200. The four signal traces can include a first signal trace carrying a voltage to the actuators 220a and 220b to move the mirror platform 205 about a first axis in a first direction, a second signal trace carrying a voltage to the actuators 220a and 220b to move the mirror platform 205 about the first axis in a second direction, a third signal trace carrying a voltage to the actuators 225a and 225b to move the mirror platform 205 and gimbal 210 about a second axis in a third direction, and a fourth signal trace carrying a voltage to the actuators 225a and 225b to move the mirror platform 205 and gimbal 210 about the second axis in a fourth direction.

In some implementations, the mirror platform 205, the gimbal 210, and the mirror substrate 215 of each MEMS mirror assembly 200 can be fabricated from a combination of the mirror substrate 215 (e.g., a double silicon-on-insulator (DSOI) wafer) bonded to a base substrate (i.e., a second silicon wafer). In some implementations, the mirror assembly 200 can be fabricated using multiple bond and polish operations.

FIGS. 3A, 3B, and 3C are diagrams of cross sections of various collimating lens arrays 300, 330, and 360, according to illustrative implementations. Each of the collimating lens arrays 300, 330, and 360 can function as the collimating lens array 115 of the OCS 100. In some implementations, the configurations of the collimating lens arrays 300, 330, and 360 can correspond to the different configurations of mirror arrays 400, 430, and 460 described in FIGS. 4A, 4B, and 4C, respectively. Each of the collimating lens arrays 300, 330, and 360 shows a different possible configuration of collimators in a 6×8 array. The collimating lens arrays 300, 330, and 360 can be configured with individual input and output collimators arranged in different manners that can provide different benefits to the OCS 100. The input collimators 310, 340, and 370 connect via internal optical fibers 110 to the external input ports 150. The output collimators 320, 350, and 380 connect via internal optical fibers 110 to the external output ports 105; however, the "input" and "output" collimators of the collimating lens arrays 300, 330, and 360 do not necessarily differ in function or structure.

FIG. 3A illustrates a cross section of a collimating lens array 300 in which optical signals traveling in a first direction pass through collimators around the periphery of the collimating lens array 300 (i.e., "input" collimators 310), and optical signals traveling in a second direction opposite the first direction pass through collimators in the interior of the collimating lens array 300 (i.e., "output" collimators 320). The input and output designations are simply arbitrary labels, and can be reversed such that the output collimators 320 lie on the perimeter of the collimating lens array 300. This configuration of the collimating lens array 300 removes from the set of possible connections between the input collimators 310 and the output collimators 320 the connections requiring the largest mirror deflection angles. Accordingly, the configuration of the collimating lens array 300 reduces the maximum necessary mirror angle, which provides the benefits described previously.

FIG. 3B illustrates a cross section of a collimating lens array 330 in which optical signals traveling in a first direction pass through collimators in a first contiguous half of the collimating lens array 330 (e.g., "input" collimators 340), and optical signals traveling in a second direction opposite the first direction pass through collimators in a second contiguous half of the collimating lens array 330 (e.g., "output" collimators 350). This configuration of the collimating lens array 330 can reduce the number of directions of movement of a corresponding mirror needed to, for example, direct optical signals from each input collimator 340 to each output collimator 350. For example, none of the mirrors corresponding to the input collimators 340 would be required to tilt to direct an optical signal in a direction away from the direction of mirrors corresponding to the output collimators 350. This can simplify the control electronics of a corresponding mirror array—for example, the mirror array 430 illustrated in FIG. 4B—by eliminating one driver and one signal trace per each mirror.

FIG. 3C illustrates a cross section of a collimating lens array 360 in which the "input" collimators 370 and the "output" collimators 380 are configured in an alternating, or checkerboard, pattern.

Figure 4A:
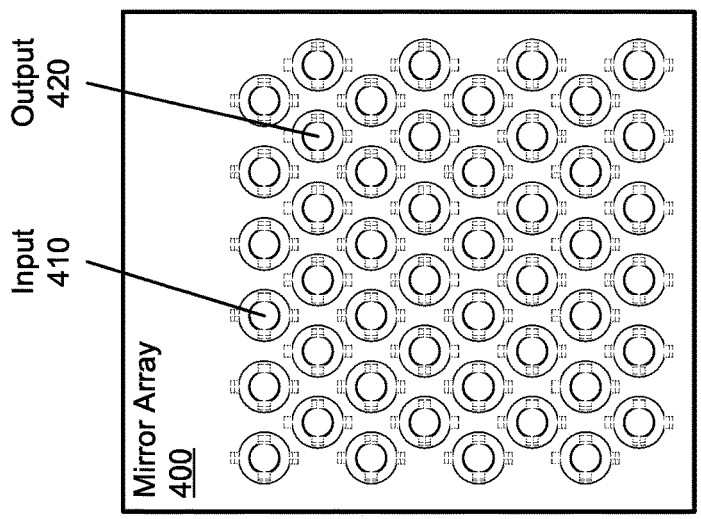
FIGS. 4A, 4B, and 4C are diagrams of MEMS mirror arrays, according to illustrative implementations.
Figure 4B:
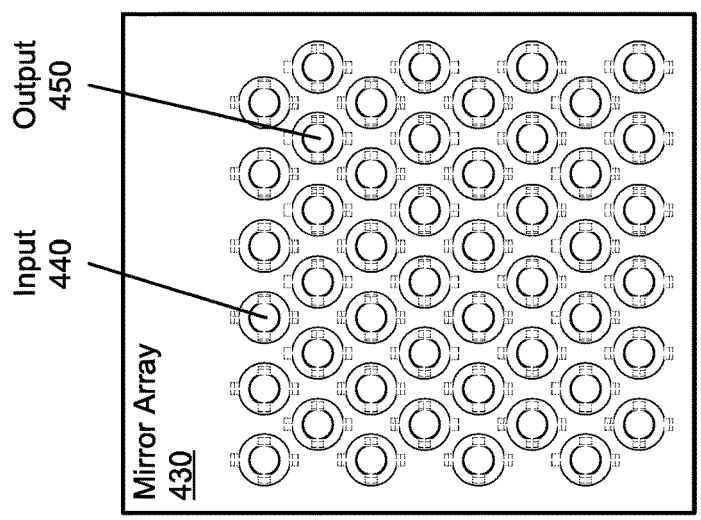
Figure 4C:
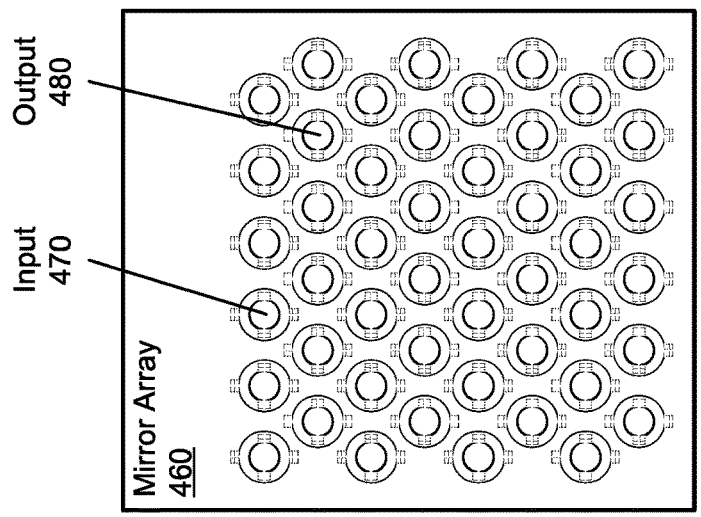

FIGS. 4A, 4B, and 4C are diagrams of MEMS mirror arrays, according to illustrative implementations. Each of the mirror arrays 400, 430, and 460 can function as the mirror array 125 of the OCS 100. In some implementations, the configurations of the mirror arrays 400, 430, and 460 can correspond to the different configurations of the collimating lens arrays 300, 330, and 360 described in FIGS. 3A, 3B, and 3C, respectively. Each of the mirror arrays 400, 430, and 460 shows a different possible configuration of mirrors in a 6×8 array. The input mirrors 410, 440, and 470 can receive optical signals from the input collimators 310, 340, and 370. Similarly, the output mirrors can send optical signals to the output collimators 320, 350, and 380. The "input" and "output" mirrors of the mirror arrays 400, 430, and 460 do not necessarily differ from each other in function or structure, but are simply designated or labeled as "input" or "output" depending on whether they receive optical signals from the collimators 300, 330, and 360, or send optical signals to the collimators 300, 330, and 360.

The mirror arrays 400, 430, and 460 can be configured with individual input and output mirrors arranged in different manners that can provide different benefits to the OCS 100. The possible configurations, as well as their corresponding benefits, generally parallel those of the collimating lens arrays 300, 330, and 360 described previously with respect to FIGS. 3A, 3B, and 3C. In particular, FIG. 4A illustrates a cross section of a mirror array 400 in which optical signals traveling in a first direction reflect off of mirrors around the periphery of the mirror array 400 (i.e., "input" mirrors 410), and optical signals traveling in a second direction opposite the first direction reflect off of mirrors in the interior of the mirror array 400 (i.e., "output" mirrors 420). With regard to FIG. 4A, the input and output designations can be reversed such that the output mirrors 420 lie on the perimeter of the mirror array 400 and the input mirrors 410 lie in the interior of the mirror array 400. FIG. 4B illustrates a cross section of a mirror array 430 in which optical signals traveling in a first direction pass through mirror in a first contiguous half of the mirror array 430 (e.g., "input" mirrors 440), and optical signals traveling in a second direction opposite the first direction pass through mirrors in a second contiguous half of the mirror array 400 (e.g., "output" mirrors 450). FIG. 4C illustrates a cross section of a mirror array 460 in which the "input" mirrors 470 and the "output" mirrors 480 are configured in an alternating or checkerboard pattern.

Figure 5:
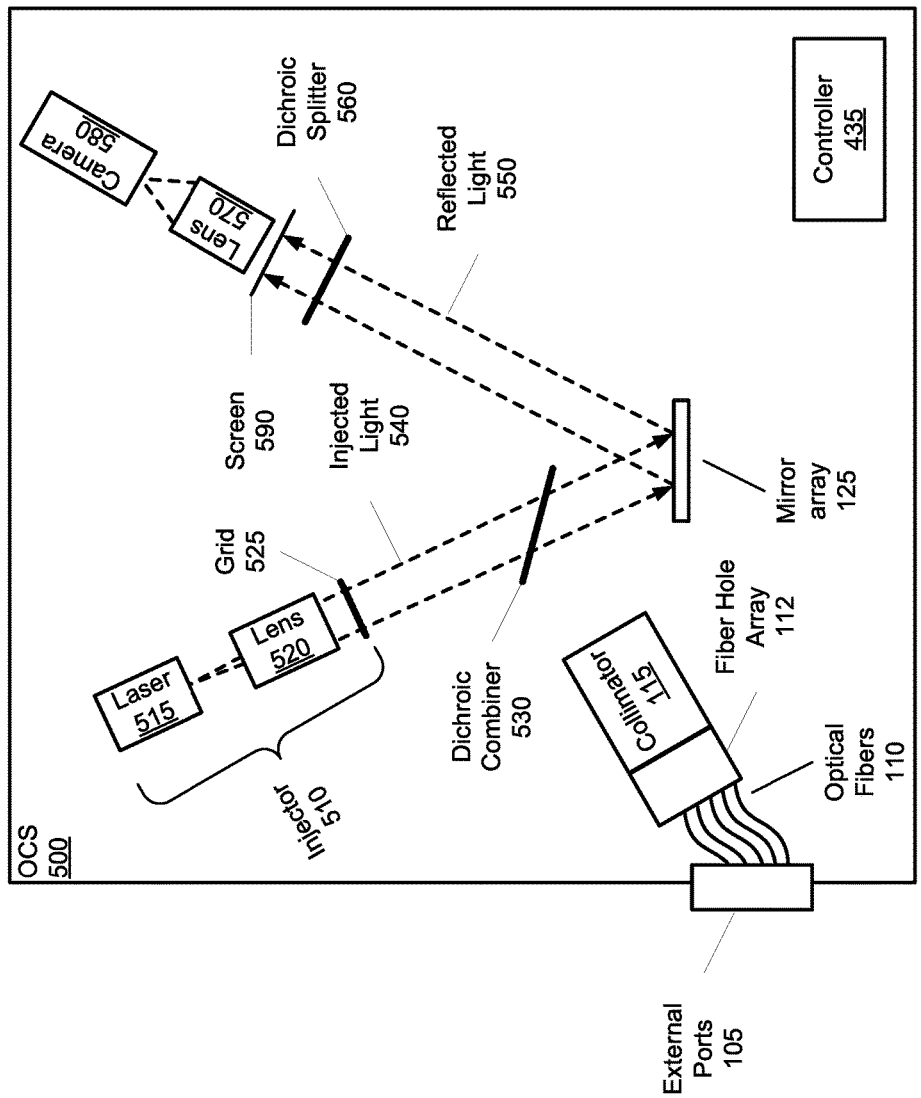
FIG. 5 is a block diagram of an optical circuit switch (OCS) with self-diagnostic features, according to an illustrative implementation.

FIG. 5 is a block diagram of an optical circuit switch (OCS) 500 with self-diagnostic features, according to an illustrative implementation. In some implementations, the OCS 100 described previously, can include self-diagnostic features. The OCS 500 is similar to the OCS 100, and includes such self-diagnostic features. The OCS 500 includes an injector 510 and a camera 580 for monitoring the state of the mirror arrays 125. The injector 510 includes a laser 515 that can direct injected light 540, through a lens or lens system 520 onto an injector grid plate 525, which can isolate individual beams of injected light 540 directed towards the mirror array 125. The injected light 540 can pass through the dichroic combiner 530. The cameras 580 can receive the reflected light 550 through a screen 590 and a second lens or lens assembly 570 and provide information regarding a status of the mirror array 125 to the controller 435. The OCS 500 can convey and switch optical signals 140 in a manner similar to the OCS 100 shown in FIG. 1; however, the optical signals 140 have been omitted in FIG. 5 for clarity.

The injector 510 includes a laser 515, a lens or lens system 520, and an injector grid plate 525. The lens 520 includes one or more optical elements that can expand and collimate the beam generated by the laser 515. The expanded and collimated beam then passes through the injector grid plate 525, which isolates an array of individual beams. The individual beams make up the injected light 540. The injected light 540 can include one beam for each mirror of the mirror array 125. The injector 510 can thus direct the individual beams of the injected light 540 towards the individual mirrors of the mirror array 125.

The OCS 500 includes a dichroic combiner 530 and a dichroic splitter 560. The dichroic combiner 530 and the dichroic splitter 560 are optical components that are tuned to transmit substantially all light of a first wavelength while reflecting substantially all light of a second wavelength different from the first wavelength. The dichroic combiner 530 and the dichroic splitter 560 can include similar structures and materials. The dichroic combiner 530 and the dichroic splitter 560 can, however, perform different functions in the OCS 500.

For example, the dichroic combiner 530 can pass substantially all of the injected light 540 towards the mirror array 125. The dichroic combiner 530 can also reflect substantially all of the optical signals emitted from the collimator 115 towards the mirror array 125. Thus the term "combiner" refers to the dichroic combiner's 530 ability to receive the injected light 540 and the optical signals from the collimator 115 from different directions, and direct both towards the mirror array 125. Light from the dichroic combiner 530 can reflect off individual mirrors of the mirror array 125 and travel towards the dichroic splitter 560.

The dichroic splitter 560 can then "split" the light from the mirror array 125 by passing substantially all of the reflected light 550 towards the screen 590, and reflecting substantially all of the optical signals back towards the mirror array 125. Thus the term "splitter" refers to the dichroic splitter's 560 ability to split the injected light 540 and the optical signals.

The OCS 500 includes a diffuser or screen 590 that scatters the reflected light 550 that is incident upon it. The lens 570 can focus the image projected onto the screen 590 by the reflected light 550 into the camera 580. The lens 570 can include a single lens or an assembly of lenses. The camera 580 receives the light focused by the lens 570, and can transmit data regarding the pattern of light appearing on the screen 590 to the controller 435 for use in determining the status of individual mirrors of the mirror array 125.

The OCS 500 includes a control 435. The controller 435 can be the same as the controller 135 previously described with regard to FIG. 1. The controller 435 may be internal to, or external to, the OCS 500. The controller 435 may include additional instructions for performing self-monitoring and self-diagnostic operations. For example, the controller 435 can determine, based on the image data received from the camera 580, the resting state of each mirror or the mirror array 125. The controller 435 can calibrate a bias to each mirror to ensure that the resting position is correct, and by extension that any active position directs optical signals in the desired direction. The controller 435 can additionally determine whether a mirror is still ringing following a repositioning. The controller 435 can similarly detect whether a mirror has failed to achieve a desired position, or whether a mirror is occluded or otherwise impaired.

The controller 435 can control optical signal routing based on mirror status information from the injector 510 and the camera 580. The controller 435 can maintain information regarding the state of each mirror and each signal path. The controller 435 can route optical signals in a manner that avoids an impaired mirror. The controller 435 can send alerts, including notifications to pause traffic on a particular optical fiber until the switching path is stable or until another switching path can be established.

Figure 6:
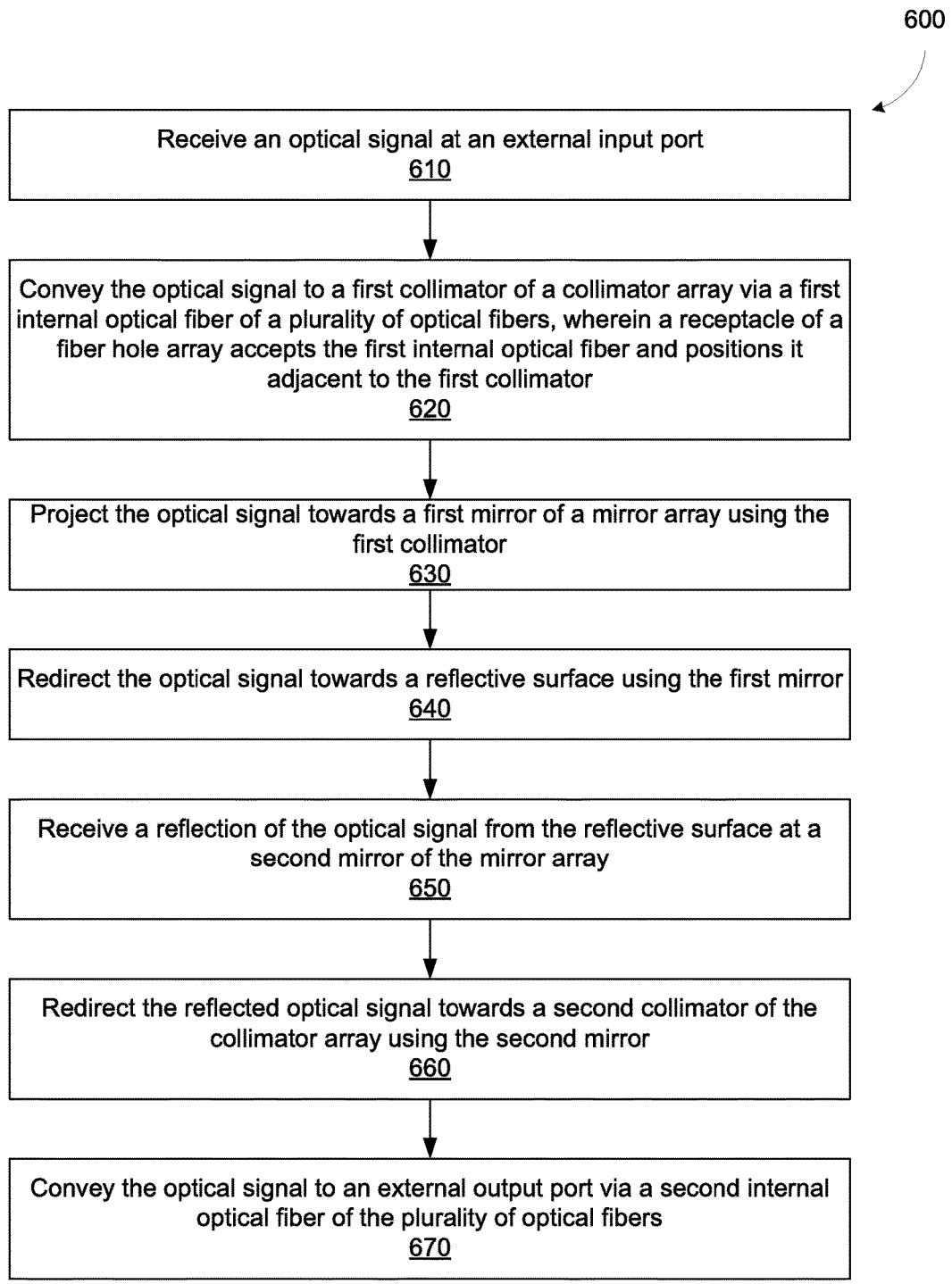
FIG. 6 is a flowchart of an example method of operating an optical circuit switch, according to an illustrative implementation.

FIG. 6 is a flowchart of an example method 600 of operating an optical circuit switch 100 or 500, according to an illustrative implementation. The method 600 includes receiving an optical signal at an external input port (stage 610). The method 600 includes conveying the optical signal to a first collimator of a collimating lens array via a first internal optical fiber of a plurality of optical fibers, wherein a receptacle of a fiber hole array accepts the first internal optical fiber and positions it adjacent to the first collimator (stage 620). The method 600 includes projecting the optical signal towards a first mirror of a mirror array using the first collimator (stage 630). The method 600 includes redirecting the optical signal towards a reflective surface using the first mirror (stage 640). The method 600 includes receiving a reflection of the optical signal from the reflective surface at a second mirror of the mirror array (stage 650). The method 600 includes redirecting the reflected optical signal towards a second collimator of the collimating lens array using the second mirror (stage 660). The method 600 includes conveying the optical signal to an external output port via a second internal optical fiber of the plurality of optical fibers (stage 670).

The method 600 includes receiving an optical signal at an external input port (stage 610). The external input port can include an external port of the external ports 105. The external input port can couple an optical signal from an external optical fiber 102 to an internal optical fiber 110.

The method 600 includes conveying the optical signal to a first collimator of a collimating lens array via a first internal optical fiber of a plurality of optical fibers, wherein a receptacle of a fiber hole array accepts the first internal optical fiber and positions it adjacent to the first collimator (stage 620). The internal optical fiber 110 can convey the optical signal to a collimator of a collimating lens array, such as the collimating lens array 115. The fiber hole array can include the fiber hole array 112 and have receptacles configured to accept the internal optical fiber 110 and position it adjacent to the first collimator. The collimating lens array 115 can be attached or bonded to the fiber hole array 112. The collimating lens array 115 and the fiber hole array 112 can be joined in a manner that provides for efficient transmission of optical signals from the internal optical fibers 110 disposed in the respective receptacles of the fiber hole array 112 into the respective collimators of the collimating lens array 115.

The method 600 includes projecting the optical signal towards a first mirror of a mirror array using the first collimator (stage 630). The mirror array can include the mirror array 125. The collimating lens array 115 can project the optical signal, either directly or indirectly via a reflection, toward the first mirror.

The method 600 includes redirecting the optical signal towards a reflective surface using the first mirror (stage 640). The mirror array 125 includes individual mirrors configured to move based on control voltages to direct beams of light—i.e., optical signals—in desired directions. The reflective surface can include the first reflective surface 130. In some implementations, the first reflective surface can include the dichroic beam splitter 560.

The method 600 includes receiving a reflection of the optical signal from the reflective surface at a second mirror of the mirror array (stage 650). The method 600 includes redirecting the reflected optical signal towards a second collimator of the collimating lens array using the second mirror (stage 660). In this manner, the mirror array 125 can reflect, with aid from the reflective surface, an optical signal from any collimator corresponding to an external input port to any collimator corresponding to an external output port.

The method 600 includes conveying the optical signal to an external output port via a second internal optical fiber of the plurality of optical fibers (stage 670). The second collimator can receive the reflected optical signal from the second mirror and couple it into a second internal optical fiber, which will convey the reflected optical signal to an external output port of the external ports 105. In this manner, the mirror array 125 is configured to controllably create an optical path from any external input port of the OCS 100 or 500 to any external output port of the OCS 100 or 500.

The method 600 can include more or fewer stages without departing from the scope of this disclosure.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical circuit switch, comprising:
a fiber hole array including an array of receptacles shaped to accept respective optical fibers;
a plurality of internal optical fibers enclosed within the optical circuit switch, with one end of each fiber disposed within a respective receptacle of the fiber hole array;
a collimating lens array positioned adjacent to the fiber hole array and including a plurality of collimators, wherein each collimator optically couples light into or out of a corresponding one of the internal optical fibers;
a MEMS mirror array;
a first reflective surface; and
a second reflective surface positioned within the optical path between the collimating lens array and the MEMS mirror array, wherein,
the fiber hole array, the collimating lens array, the MEMS mirror array, the first reflective surface, and the second reflective surface are positioned relative to one another such that light exiting each of the internal optical fibers passes through its corresponding collimator, reflects off the second reflective surface, and is redirected by a first mirror within the MEMS array towards the first reflective surface, which directs the light back towards a second mirror of the MEMS mirror array, which in turn redirects the light towards a second internal optical fiber via the second reflective surface and a second collimator.

2. The optical circuit switch of claim 1, further comprising:
a plurality of external optical fiber input ports, each coupling to one of the internal optical fibers; and
a plurality of external optical fiber output ports, each coupling to one of the internal optical fibers.

3. The optical circuit switch of claim 2, wherein the MEMS mirror array is configured such that each mirror can be rotated in about two axes by less than about 10° while directing light from an internal optical fiber coupled to an external optical fiber input port to any internal optical fiber coupled to an external optical fiber output port.

4. The optical circuit switch of claim 2, wherein:
each of the internal optical fibers that corresponds to a collimator located around a perimeter of the collimating lens array couples to an external optical fiber output port, and
each of the internal optical fibers that corresponds to a collimator located inside the perimeter of the collimating lens array couples to an external optical fiber input port.

5. The optical circuit switch of claim 2, wherein:
each of the internal optical fibers that corresponds to a collimator located around a perimeter of the collimating lens array couples to an external optical fiber input port, and
each of the internal optical fibers that corresponds to a collimator located inside the perimeter of the collimating lens array couples to an external optical fiber output port.

6. The optical circuit switch of claim 2, wherein:
each of the internal optical fibers that corresponds to a collimator located within a first contiguous half of the collimating lens array couples to an external optical fiber output port, and
each of the internal optical fibers that corresponds to a collimator located within a second contiguous half of the collimating lens array couples to an external optical fiber input port.

7. The optical circuit switch of claim 6, further comprising driver circuits configured to apply voltages to actuators coupled to each MEMS mirror to cause the MEMS mirrors to rotate in two directions about one axis and in only a single direction about a second axis.

8. The optical circuit switch of claim 2, wherein within the collimating lens array, collimators corresponding to internal optical fibers coupled to external optical fiber input ports and collimators corresponding to internal optical fibers coupled to external optical fiber output ports alternate according to a checkerboard pattern.

9. The optical circuit switch of claim 1, wherein the first and second reflective surfaces are configured to reflect light of at least a first wavelength and to be substantially transmissive with respect to a light of a second wavelength, and the optical circuit switch comprises:
a light source located behind the second reflective surface and directed towards the MEMS mirror array; and
a light detector located behind the first reflective surface to detect light emitted by the light source that has passed through the second reflective surface, off of the mirror array, and through the first reflective surface.

10. The optical circuit switch of claim 9, further comprising a processor configured to receive an output signal from the light detector and to determine calibration parameters for the MEMS mirror array based on the output signal.

11. An optical circuit switch, comprising:
a plurality of external optical fiber input ports;
a plurality of external optical fiber output ports;
a fiber hole array including an array of receptacles shaped to accept optical fibers;
a collimating lens array including a plurality of collimators positioned adjacent to the fiber hole array and configured for directing light into or out of optical fibers disposed in the receptacles of the fiber hole array;
a plurality of internal optical fibers enclosed within the optical circuit switch, each optically coupling at one end to an optical fiber input port or an optical fiber output port and disposed at an opposite end into a respective receptacle in the fiber hole array;
a MEMS mirror array for selectively controlling optical paths of light exiting respective optical fibers disposed in the fiber hole array such that such light is introduced into different respective optical fibers disposed in the fiber hole array;
a first reflective surface, wherein the fiber hole array, the collimator, the MEMS mirror array and the first reflective surface are positioned relative to one another such that light exiting each of the internal optical fibers passes through its corresponding collimator and is redirected by a first mirror within the MEMS array towards the first reflective surface, which directs the light back towards a second mirror of the MEMS mirror array, which in turn redirects the light towards a second internal optical fiber; and a second reflective surface, wherein the second reflective surface is positioned to redirect light passing through the collimator towards the MEMS mirror array.

12. The optical circuit switch of claim 11, wherein the first reflective surface is a dichroic splitter and the second reflective surface is a dichroic combiner.

13. The optical circuit switch of claim 12, comprising:

a laser and a first lens configured to direct the laser beam through the dichroic combiner to a mirror of the MEMS mirror array; and a second lens and a camera configured to receive a reflection of the laser beam from the mirror.

14. The optical circuit switch of claim 11, wherein:

each of the internal optical fibers that corresponds to a collimator located around a perimeter of the collimating lens array couples to an external optical fiber output port, and each of the internal optical fibers that corresponds to a collimator located inside the perimeter of the collimating lens array couples to an external optical fiber input port.

15. The optical circuit switch of claim 11, wherein:

each of the internal optical fibers that corresponds to a collimator located around a perimeter of the collimating lens array couples to an external optical fiber input port, and each of the internal optical fibers that corresponds to a collimator located inside the perimeter of the collimating lens array couples to an external optical fiber output port.

16. The optical circuit switch of claim 11, wherein:

each of the internal optical fibers that corresponds to a collimator located within a first contiguous half of the collimating lens array couples to an external optical fiber output port, and each of the internal optical fibers that corresponds to a collimator located within a second contiguous half of the collimating lens array couples to an external optical fiber input port.

17. The optical circuit switch of claim 11, wherein within the collimating lens array, collimators corresponding to internal optical fibers coupled to external optical fiber input ports and collimators corresponding to internal optical fibers coupled to external optical fiber output ports alternate according to a checkerboard pattern.

\* \* \* \* \*